US 7,793,228 B2

(12) United States Patent
Mansfield et al.

(10) Patent No.: US 7,793,228 B2
(45) Date of Patent: Sep. 7, 2010

(54) METHOD, SYSTEM, AND GRAPHICAL USER INTERFACE FOR TEXT ENTRY WITH PARTIAL WORD DISPLAY

(75) Inventors: Philip Andrew Mansfield, Vancouver (CA); Michael Robert Levy, Vancouver (CA)

(73) Assignee: Apple Inc., Cupertino, CA (US)

( * ) Notice: Subject to any disclaimer, the term of this patent is extended or adjusted under 35 U.S.C. 154(b) by 242 days.

(21) Appl. No.: 11/549,624

(22) Filed: Oct. 13, 2006

(65) Prior Publication Data

US 2008/0259022 A1    Oct. 23, 2008

(51) Int. Cl.
*G06F 3/048*    (2006.01)

(52) U.S. Cl. ...................................... 715/780; 715/816

(58) Field of Classification Search .................. 715/773, 715/780, 816, 863, 864, 815
See application file for complete search history.

(56) References Cited

U.S. PATENT DOCUMENTS

| | | | |
|---|---|---|---|
| 5,305,205 A | 4/1994 | Weber et al. | 364/419.1 |
| 5,736,974 A | 4/1998 | Selker | 345/146 |
| 5,748,512 A | 5/1998 | Vargas | 364/709.12 |
| 5,818,451 A | 10/1998 | Bertram et al. | 345/354 |
| 5,896,321 A * | 4/1999 | Miller et al. | 365/189.15 |
| 6,040,824 A | 3/2000 | Maekawa et al. | 345/173 |
| 6,073,036 A | 6/2000 | Heikkinen et al. | 455/575 |
| 6,169,538 B1 | 1/2001 | Nowlan et al. | 345/168 |
| 6,259,436 B1 | 7/2001 | Moon et al. | 345/173 |
| 6,271,835 B1 | 8/2001 | Hoeksma | 345/168 |
| 6,307,548 B1 | 10/2001 | Flinchem et al. | 345/352 |
| 6,469,722 B1 | 10/2002 | Kinoe et al. | 345/837 |
| 6,597,345 B2 | 7/2003 | Hirshberg | 345/168 |
| 6,795,059 B2 | 9/2004 | Endo | 345/173 |
| 6,803,905 B1 | 10/2004 | Capps et al. | 345/173 |
| 6,857,800 B2 | 2/2005 | Zhang et al. | 400/473 |
| 7,038,659 B2 | 5/2006 | Rajkowski | 345/156 |
| 7,057,607 B2 | 6/2006 | Mayoraz et al. | 345/173 |
| 7,194,699 B2 | 3/2007 | Thomson et al. | 715/823 |
| 7,319,957 B2 * | 1/2008 | Robinson et al. | 704/252 |
| 7,443,316 B2 * | 10/2008 | Lim | 341/22 |
| 7,477,240 B2 | 1/2009 | Yanagisawa | 345/173 |
| 7,508,324 B2 | 3/2009 | Suraqui | 341/22 |
| 7,526,738 B2 | 4/2009 | Ording et al. | 715/862 |
| 2002/0140679 A1 | 10/2002 | Wen | 345/168 |

(Continued)

FOREIGN PATENT DOCUMENTS

WO    WO 98/33111 A1    7/1998

OTHER PUBLICATIONS

CALL Centre 1999, "Word Prediction," Copyright (c) The CALL Centre & Scottish Executive Education Dept., pp. 63-73.

(Continued)

*Primary Examiner*—Thanh T Vu
(74) *Attorney, Agent, or Firm*—Morgan, Lewis & Bockius LLP

(57) ABSTRACT

A computer-implemented method for text entry includes receiving entered text from a user, selecting a set of candidate sequences for completing or continuing the sequence, and presenting the candidate sequences to the user, wherein the candidate sequences include partial words. The candidate sequences are identified based on usage frequency weights stored in a tree data structure. A graphical user interface for text entry includes displaying a current input sequence of characters and the identified partial words.

15 Claims, 12 Drawing Sheets

U.S. PATENT DOCUMENTS

| | | | |
|---|---|---|---|
| 2004/0070567 A1 | 4/2004 | Longe et al. | 345/156 |
| 2004/0135774 A1 | 7/2004 | La Monica | 345/174 |
| 2004/0160419 A1 | 8/2004 | Padgitt | 345/173 |
| 2004/0178994 A1 | 9/2004 | Kairls, Jr. | 345/173 |
| 2004/0183833 A1 | 9/2004 | Chua | 345/773 |
| 2005/0024341 A1 | 2/2005 | Gillespie et al. | 345/173 |
| 2005/0131687 A1* | 6/2005 | Sorrentino | 704/235 |
| 2005/0193351 A1 | 9/2005 | Huoviala | 715/815 |
| 2006/0190256 A1* | 8/2006 | Stephanick et al. | 704/252 |
| 2006/0206454 A1* | 9/2006 | Forstall et al. | 707/3 |
| 2006/0274051 A1 | 12/2006 | Longe et al. | 345/173 |
| 2007/0061754 A1 | 3/2007 | Ardhanari et al. | 715/816 |
| 2007/0152978 A1 | 7/2007 | Kocienda et al. | 345/173 |
| 2008/0059876 A1 | 3/2008 | Hantler et al. | 715/257 |

OTHER PUBLICATIONS

Dyslexic.com, "AlphaSmart 3000 with CoWriter SmartApplet: Don Johnston Special Needs," http://vvvvw.dyslexic.com/procuts.php?catid-2&pid=465&PHPSESSID=2511b800000f7da..., printed Dec. 6, 2005, 13 pages.

Glossary of Adaptive Technologies: Word Prediction, http://www.utoronto.ca/atrc/reference/techwordpred.html, printed Dec. 6, 2005, 5 pages.

MacTech, "KeyStrokes 3.5 for Mac OS X Boosts Word Prediction," http://www.mactech.com/news/?p=1007129, printed Jan. 7, 2008, 3 pages.

Mobile Tech News, "T9 Text Input Software Updated," htpp://www.mobiletechnews.com/info/2004/11/23/122155.html, Dec. 8, 2005, 4 pages.

NCIP: Word Prediction Collection, "What is Word Prediction?" http://www2.edc.org/NCIP/library/wp/What_is.htm, printed Jan. 7, 2008, 2 pages.

NCIP: Word Prediction Collection, NCIP Library: Word Prediction Collection, http://www2.edc.org/NCIP/library/wp/toc.htm, printed Jan. 7, 2008, 4 pages.

International Search Report and Written Opinion for International Application PCT/US2007/088872, mailed May 8, 2008.

International Search Report and Written Opinion for International Application PCT/US2007/088873, mailed May 8, 2008.

Office Action dated May 22, 2009, for U.S. Appl. No. 11/459,615.

Office Action dated May 28, 2009, for U.S. Appl. No. 11/459,606.

Office Action dated Nov. 20, 2009, received in U.S. Appl. No. 11/620,641 (related).

* cited by examiner (i.e, the word "cab" plus a space)

Figure 7A

| Pointer | Weight |
|---|---|
| Pointer to node "ca" | Weight of node "ca" |
| Pointer to node "cy" | Weight of node "cy" |

| Pointer | Weight |
|---|---|
| Pointer to node "ca" | Weight of node "ca" - weight of node "cab" |
| Pointer to node "cy" | Weight of node "cy" - weight of node "cyc" |
| Pointer to node "cab" | Weight of node "cab" |
| Pointer to node "cyc" | Weight of node "cyc" |

| Pointer | Weight |
|---|---|
| Pointer to node "ca" | Weight of node "ca" - weight of node "cab" |
| Pointer to node "cab" | Weight of node "cab" |
| Pointer to node "cyc" | Weight of node "cyc" |

700

METHOD, SYSTEM, AND GRAPHICAL USER INTERFACE FOR TEXT ENTRY WITH PARTIAL WORD DISPLAY

TECHNICAL FIELD

The disclosed embodiments relate generally to portable electronic devices, and more particularly, to a method, system, and graphical user interface for entering text on a portable electronic device.

BACKGROUND

As portable electronic devices become more compact, and the amount of information to be processed and stored increases, it has become a significant challenge to design a user interface that allows users to easily interact with the device. This is unfortunate because the user interface is the gateway through which users receive not only content but also responses to user actions or behaviors, including user attempts to access a device's features or tools. Some portable electronic devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

The interfaces for entering text that are currently available suffer the same shortcomings. Users of portable devices often have to enter text using keys or buttons that are overloaded with multiple letters or with buttons that do not correspond to any letter in particular. With these keys or buttons, entering just one letter can take multiple key or button presses. This makes the text entry process cumbersome and inefficient.

Accordingly, there is a need for more efficient interfaces for entering text on a portable device.

SUMMARY

The present invention reduces the problem described above by providing a method, system, and graphical user interface for text entry with partial word display. As used herein, a "partial word" is a character sequence of two or more characters that is less than a complete word and which may be presented to a user for selection, thereby increasing the speed of the text entry process.

According to some embodiments, a computer-implemented method includes receiving an input sequence of one or more characters; identifying one or more candidate sequences that satisfy predefined usage frequency criteria with respect to the input sequence, wherein each candidate sequence includes a concatenation of the input sequence and one or more additional characters and wherein the candidate sequences include partial words; and presenting the partial words.

According to some embodiments, a graphical user interface includes an input sequence of one or more characters, the input sequence corresponding to an input by a user; and one or more candidate sequences that satisfy predefined usage frequency criteria with respect to the input sequence, wherein each candidate sequence includes a concatenation of the input sequence and one or more additional characters and wherein the candidate sequences include partial words.

According to some embodiments, there is a computer program product for use in conjunction with a portable electronic device. The computer program product comprises a computer readable storage medium and a computer program mechanism embedded therein. The computer program mechanism includes instructions for receiving an input sequence of one or more characters; instructions for identifying one or more candidate sequences that satisfy predefined usage frequency criteria with respect to the input sequence, wherein each candidate sequence includes a concatenation of the input sequence and one or more additional characters and wherein the candidate sequences include partial words; and instructions for presenting the partial words.

According to some embodiments, there is a portable electronic device. The device includes a display; one or more processors; memory; and a program, wherein the program is stored in the memory and configured to be executed by the one or more processors. The program includes instructions to receive an input sequence of one or more characters; instructions to identify one or more candidate sequences that satisfy predefined usage frequency criteria with respect to the input sequence, wherein each candidate sequence includes a concatenation of the input sequence and one or more additional characters and wherein the candidate sequences include partial words; and instructions to present the partial words.

According to some embodiments, there is a portable electronic device. The device includes display means; one or more processor means; memory means; and a program mechanism, wherein the program mechanism is stored in the memory means and configured to be executed by the one or more processors means. The program mechanism includes instructions for receiving an input sequence of one or more characters; instructions for identifying one or more candidate sequences that satisfy predefined usage frequency criteria with respect to the input sequence, wherein each candidate sequence includes a concatenation of the input sequence and one or more additional characters and wherein the candidate sequences include partial words; and instructions for presenting the partial words.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 7A-7C illustrate a list of children nodes in a character sequence tree that satisfies usage frequency criteria in accordance with some embodiments.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the invention.

Embodiments of user interfaces and associated processes for using a portable electronic device are described. In some embodiments, the device is a portable communications device. The user interface may include a click wheel and/or touch screen. A click wheel is a user-interface device that may provide navigation commands based on an angular displacement of the wheel or a point of contact with the wheel by a user of the device. In some embodiments, the click wheel is a physical device that is separate from a display (e.g., FIG. 2A). In other embodiments, the click wheel is virtual device that is displayed on a touch screen or other display (e.g., FIG. 2B). A click wheel may also be used to provide a user command corresponding to selection of one or more items, for example, when the user of the device presses down on at least a portion of the wheel or the center of the wheel. For simplicity, in the discussion that follows, a portable communications device (e.g., a cellular telephone that may also contain other functions, such as text messaging, PDA and music player functions) that includes a click wheel is used as an exemplary embodiment. It should be understood, however, that the user interfaces and associated processes may be applied to other devices, such as personal digital assistants (PDA's), personal computers and laptops, which may include one or more other user-interface devices, such as a keyboard, a mouse and/or a joystick.

The device may support a variety of applications, such as one or more telephone applications, a text message application, and a music player. The music player may be compatible with one or more file formats, such as MP3 and/or AAC. In an exemplary embodiment, the device includes an iPod music player (trademark of Apple Computer, Inc.).

The various applications that may be executed on the device may use at least one common physical user-interface device, such as a physical click wheel or a touch screen with a virtual click wheel. One or more functions of the click wheel as well as corresponding information displayed on the device may be adjusted and/or varied from one application to the next and/or within a respective application. In this way, a common physical architecture (such as the click wheel or the touch screen) of the device may support the variety of applications with user interfaces that are intuitive and transparent to a user.

Figure 1:
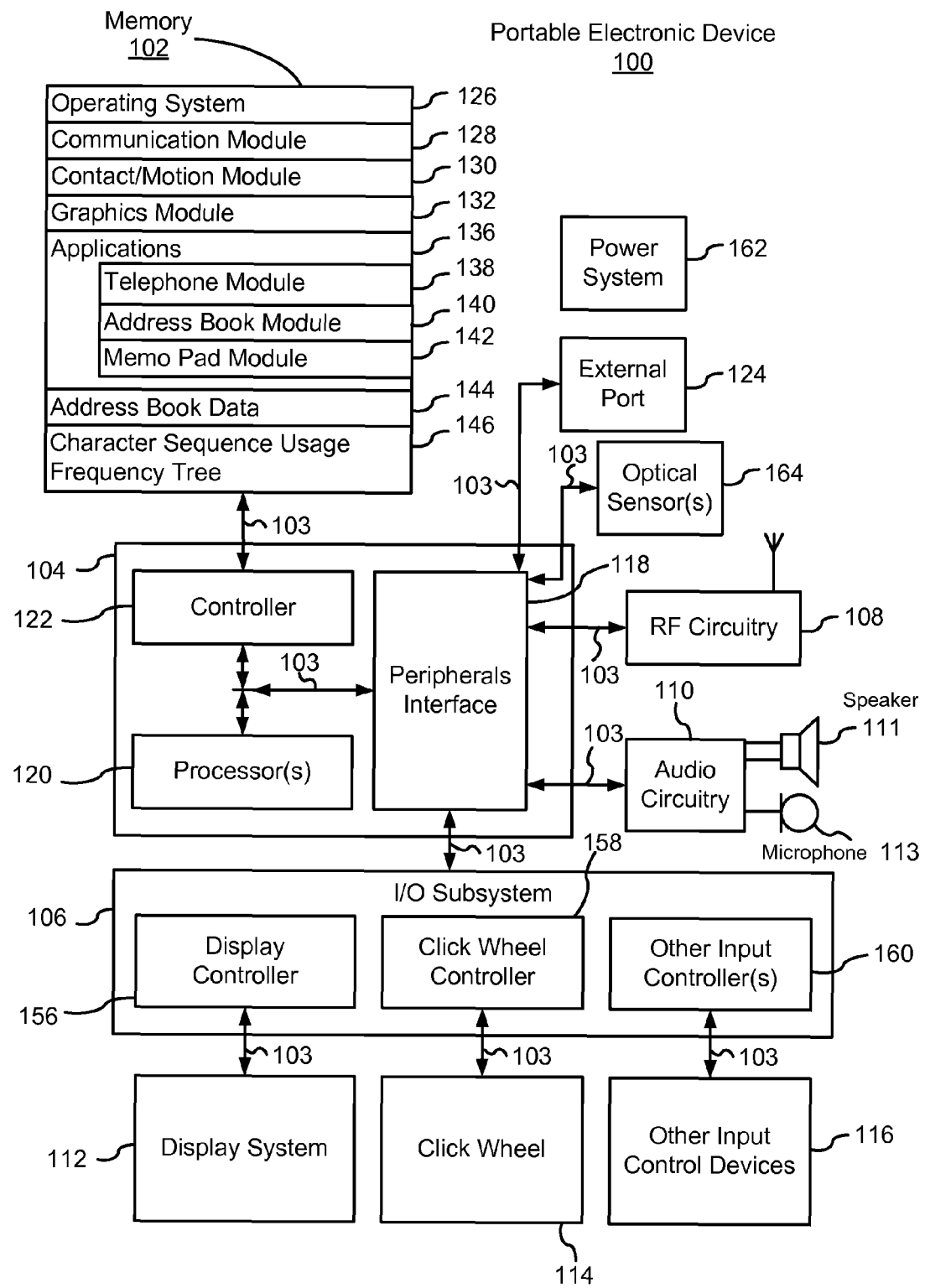
FIG. 1 is a block diagram illustrating a portable electronic device in accordance with some embodiments.

Attention is now directed towards embodiments of the device. FIG. 1 is a block diagram illustrating a portable electronic device 100 in accordance with some embodiments. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, a display system 112 (which may include a touch screen), a click wheel 114, other input or control devices 116, and an external port 124. The device 100 may optionally include one or more optical sensors 164. These components may communicate over one or more communication buses or signal lines 103. The device 100 may be any portable electronic device, including but not limited to a handheld computer, a tablet computer, a mobile telephone, a media player, a personal digital assistant (PDA), or the like, including a combination of two or more of these items.

It should be appreciated that the device 100 is only one example of a portable communications device 100, and that the device 100 may have more or fewer components than shown, may combine two or more components, or a may have a different configuration or arrangement of the components. The various components shown in FIG. 1 may be implemented in hardware, software or a combination of both hardware and software, including one or more signal processing and/or application specific integrated circuits.

Memory 102 may include high speed random access memory and may also include non-volatile memory, such as one or more magnetic disk storage devices, flash memory devices, or other non-volatile solid state memory devices. In some embodiments, memory 102 may further include storage remotely located from the one or more processors 120, for instance network attached storage accessed via the RF circuitry 108 or the external port 124 and a communications network (not shown) such as the Internet, intranet(s), Local Area Networks (LANs), Wide Local Area Networks (WLANs), Storage Area Networks (SANs) and the like, or any suitable combination thereof. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (not shown). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the display system 112, the click wheel 114 and other input/control devices 116, to the peripherals interface 118. The I/O subsystem 106 may include a display controller 156, a click wheel controller 158 and one or more input controllers 160 for other input or control devices. The one or more input controllers 160 receive/send electrical signals from/to other input or control devices 160. The other input/control devices 160 may include physical buttons (e.g., push buttons, rocker buttons, etc.), dials, slider switches, joysticks, and so forth.

The display system 112 provides an output interface and/or an input interface between the device and a user. The display controller 156 receives and/or sends electrical signals from/to the display system 112. The display system 112 displays visual output to the user. The visual output may include text, icons, graphics, video, and any combination thereof. In some embodiments, some or all of the visual output may correspond to user-interface objects, further details of which are described below.

In some embodiments, such as those that include a touch screen, the display system 112 also accepts input from the user based on haptic and/or tactile contact. In embodiments with a touch screen, the display system 112 forms a touch-sensitive surface that accepts user input. In these embodiments, the display system 112 and the display controller 156 (along with any associated modules and/or sets of instructions in memory 102) detect contact (and any movement or breaking of the contact) on the display system 112 and converts the detected contact into interaction with user-interface objects, such as one or more soft keys or a virtual click wheel, that are displayed on a touch screen. In an exemplary embodiment, a point of contact between a touch screen in the display system 112 and the user corresponds to one or more digits of the user.

In embodiments with a touch screen, the touch screen in the display system 112 may use LCD (liquid crystal display) technology, or LPD (light emitting polymer display) technology, although other display technologies may be used in other embodiments. A touch screen in the display system 112 and the display controller 156 may detect contact and any movement or breaking thereof using any of a plurality of touch sensing technologies, including but not limited to capacitive, resistive, infrared, and surface acoustic wave technologies, as well as other proximity sensor arrays or other elements for determining one or more points of contact with a touch screen in the display system 112. A touch-sensitive display in some embodiments of the display system 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference. However, a touch screen in the display system 112 displays visual output from the portable device 100, whereas touch sensitive tablets do not provide visual output. The touch screen in the display system 112 may have a resolution in excess of 100 dpi. In an exemplary embodiment, the touch screen in the display system has a resolution of approximately 168 dpi. The user may make contact with the touch screen in the display system 112 using any suitable object or appendage, such as a stylus, a finger, and so forth.

In some embodiments, in addition to a touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen in the display system 112 or an extension of the touch-sensitive surface formed by the touch screen.

The device 100 may include a physical or virtual click wheel 114. A user may navigate among and interact with one or more graphical objects (henceforth referred to as icons) displayed in the display system 112 by rotating the click wheel 114 or by moving a point of contact with the click wheel 114 (e.g., where the amount of movement of the point of contact is measured by its angular displacement with respect to a center point of the click wheel). The click wheel 114 may also be used to select one or more of the displayed icons. For example, the user may press down on at least a portion of the click wheel 114 or an associated button. User commands and navigation commands provided by the user via the click wheel 114 may be processed by the click wheel controller 158 as well as one or more of the modules and/or sets of instructions in memory 102. For a virtual click wheel, the click wheel 114 and click wheel controller 158 may be part of the display system 112 and the display controller 156, respectively. For a virtual click wheel, the click wheel may be either an opaque or semitransparent object that appears and disappears on a display in response to user interaction with the device. In some embodiments, a virtual click wheel is displayed on the touch screen of a portable electronic device and operated by user contact with the touch screen. In other embodiments, a virtual click wheel is displayed on a computer screen and operated with a mouse, touch pad, or other pointing device.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIG. 1 shows an optical sensor coupled to the peripherals interface 118. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module (not shown), the optical sensor 164 may capture still images or video.

In some embodiments, the software components stored in memory 102 may include an operating system 126, a communication module (or set of instructions) 128, a contact/motion module (or set of instructions) 130, a graphics module (or set of instructions) 132, and one or more applications (or set of instructions) 136. The applications module 136 may include a telephone module (or set of instructions) 138, an address book module (or set of instructions) 140 and/or a memo pad module (or set of instructions) 142.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the click wheel 114 (in conjunction with the click wheel controller 158) and/or a touch screen in the display system 112 (in conjunction with the display controller 156). The contact/motion module 130 includes various software components for performing various operations related to detection of contact, such as determining if contact has occurred, determining if there is movement of the contact and tracking the movement across the click wheel 114 and/or a touch screen in the display system 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. In some embodiments, the contact/motion module 130 and the display controller 156 also detects contact on a touchpad.

The graphics module 132 includes various known software components for rendering and displaying graphics on the display system 112, including components for changing the intensity of graphics that are displayed. Note that the term "graphics" includes any object that can be displayed to a user, including without limitation text, web pages, icons (such as user-interface objects including soft keys), digital images, videos, animations and the like.

In addition to the telephone module 138, the address book module 140 and/or the memo pad module 142, the one or more applications 136 may include any applications installed on the device 100, including without limitation, a browser, email, instant messaging, text messaging, word processing, keyboard emulation, widgets, JAVA-enabled applications, encryption, digital rights management, voice recognition, voice replication, location determination capability (such as that provided by the Global Positioning System (GPS)), etc.

In conjunction with the RF circuitry 108, the audio circuitry 110, the speaker 111, the microphone 113, the display system 112, the display controller 156, the click wheel 114 and/or the click wheel controller 158, the telephone module 138 may be used to enter a sequence of characters corresponding to a telephone number, access one or more telephone numbers in the address book 144, modify a telephone number that has been entered, dial a respective telephone number, conduct a conversation and disconnect or hang up when the conversation is completed. The telephone module 138 may also be used to receive a second call while a first call is already ongoing, without disconnecting the first call, or conduct a conference call.

In conjunction with the display system 112, the display controller 156, the click wheel 114 and/or the click wheel controller 158, the address book module 140 may be used to manage address book data or contact list data 144, including adding a name, deleting a name, associating a telephone number or other information with a name, associating an image with a name, categorizing and sorting names, and so forth.

In conjunction with the display system 112, the display controller 156, the click wheel 114 and/or the click wheel controller 158, the memo pad module or other text application 142 may be used to enter text for storage in memory 102. In conjunction with the character sequence usage frequency tree 146, as text is entered in the memo pad module 142, character sequences may be provided as suggestions to the user in order to facilitate text entry, further details of which are described below.

Figure 4:
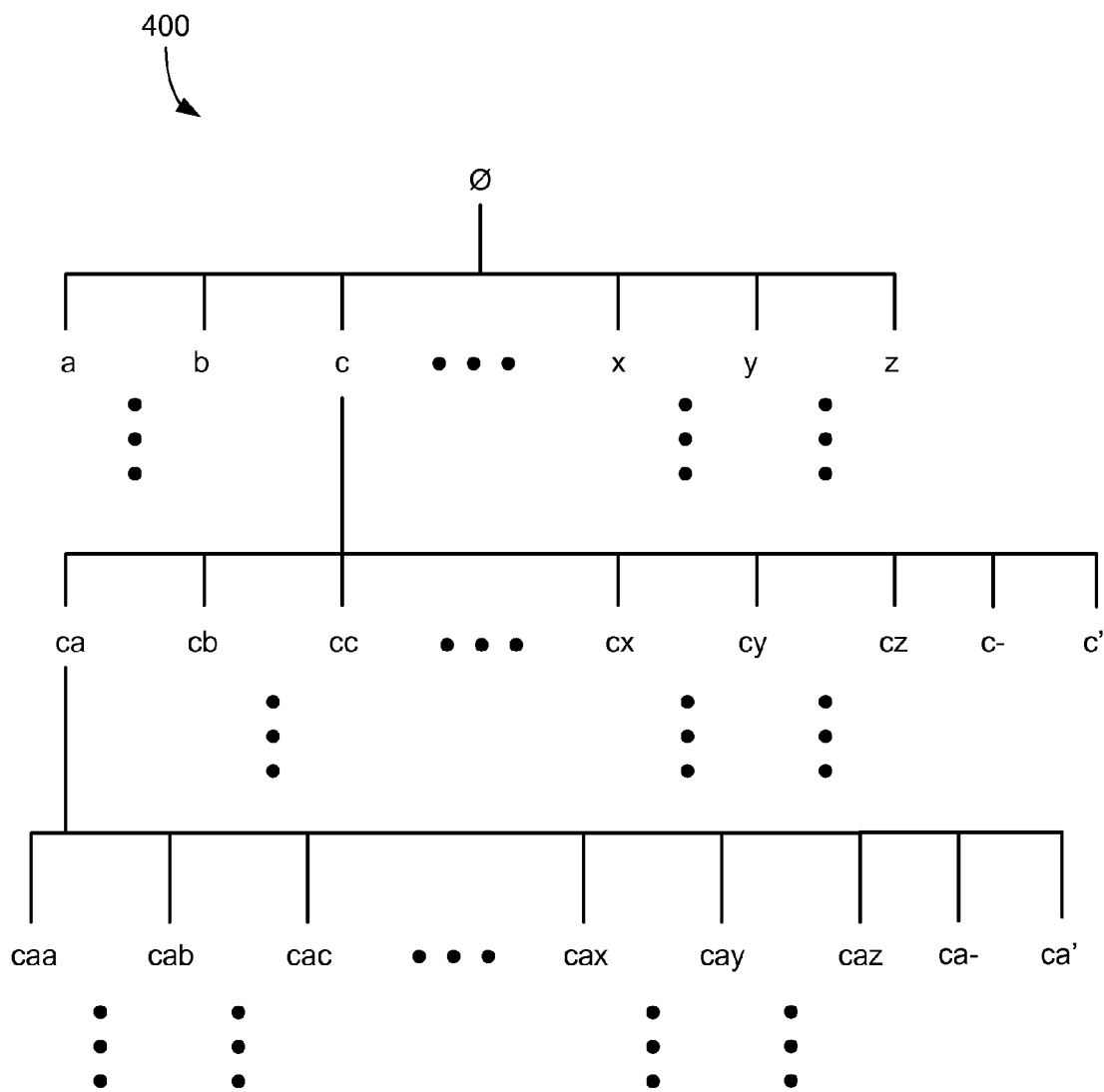
FIG. 4 illustrates a conceptual diagram of a character sequence usage frequency tree in accordance with some embodiments.

The character sequence usage frequency tree 146, an exemplary conceptual diagram of which is shown in FIG. 4, stores usage frequencies for complete words and partial words in a tree data structure. The root node of the usage frequency tree 146 corresponds to an empty string. In the usage frequency tree, a first node is a child of a second node if the character sequence corresponding to the first node is the concatenation of the character sequence corresponding to the second node and one additional character. It should be appreciated that the preceding statement ignores the promotion of grandchildren nodes to children nodes, which is described below. Each node in the usage frequency tree 146, other than the root node, corresponds to a distinct character sequence that is a complete or partial word. A node representing a completed word is distinct from a node representing a partial word made from the same sequence of characters, and the former is a child of the latter in the tree. In some embodiments, a completed word is represented by appending a particular character, such as a space character, to the end of its parent sequence. This representation has the property that a first node is a child of a second node only if the character sequence corresponding to the first node is the concatenation of the character sequence corresponding to the second node and one additional character. In some embodiments, the memory 102 stores, for a node, the last character of the character sequence corresponding to that node, as opposed to the entire sequence for that node. The full character sequence corresponding to a node may be identified by backtracking through the ancestor nodes to the root node and prepending the characters stored for the ancestor nodes. It should be appreciated that the character set used for the usage frequency tree need not be limited to English letters or to the characters shown in FIG. 4. For example, it may include any or all of the following: characters from other languages and writing systems, accented characters, ligatures, punctuation, mathematical symbols, and other kinds of symbols.

In some embodiments, the usage frequency tree includes leaves that are complete words. In some embodiments the usage frequency tree includes leaves that are phrases or sentences. Additionally, in some embodiments, in order to limit the size of the usage frequency tree, the usage frequency tree may have a predefined maximum depth. In this situation, the length of a character sequence in the usage frequency tree is at most the maximum depth of the usage frequency tree. In some embodiments, other criteria may be used to prune the full theoretical usage frequency tree in advance of storing it. For example, using the notion of node weight discussed below, any node whose weight is below a predefined minimum may be removed from the usage frequency tree in advance of storing the tree, along with all of its descendants. Alternatively, any node whose weight, when divided by the weight of its parent, is below a predefined minimum, may be removed from the usage frequency tree in advance, along with all of its descendants.

A node in the usage frequency tree 146 is also associated with a usage frequency weight of the corresponding character sequence. In some embodiments, the usage frequency weight is equal or proportional to the number of occurrences of the character sequence in a representative sample of text. In that case, the weight of a node divided by the weight of its parent is an estimate of the probability that, given the parent sequence, its continuation will be the child sequence. Thus, if the tree includes all partial and complete words occurring in the representative sample of text, the weight of any node will be equal to the sum of the weights of its child nodes. Alternatively, if the usage frequency tree has been pruned in advance, then the weight of any node will be greater than or equal to the sum of the weights of its child nodes. In some embodiments, the usage frequency weight is equal or proportional to the number of occurrences of the character sequence in a representative sample of text divided by the number of characters in the character sequence or by a nondecreasing function of the number of characters in the sequence. This division has the effect of reducing the weight of longer sequences. In some embodiments, the usage frequency weight of a node is a nonincreasing function of the usage frequency ranking of the corresponding character sequence. In some embodiments, the representative sample of text used to determine usage frequencies includes all or part of a broad range of published texts in a given language. In other embodiments, the representative sample of text is customized for locale, domain of application (including domain-specific terminology), software application, or other criteria. In some embodiments, the user can select and/or customize the representative sample of text. In some embodiments, the user can select and/or customize the set of weights. In some embodiments, the weights are automatically (i.e., without user intervention) updated based on the text that the user enters. For example, after each text entry session, the weights can be updated to be a weighted average of the prior usage frequency weights and the usage frequency weights derived from the text entered in that session. In some embodiments, the usage frequency tree includes nodes representing full or partial sequences of words in addition to full or partial words, and the representative sample of text includes a variety of instances of grammar usage, or the weights are otherwise determined in a manner that takes into account grammar rules.

In some embodiments, the portable device 100 is a device where operation of a predefined set of functions on the device is performed exclusively through a touch screen in the display system 112 and/or a touchpad. By using a touch screen and/or a touchpad as the primary input/control device for operation of the device 100, the number of physical input/control devices (such as push buttons, dials, and the like) on the device 100 may be reduced. In one embodiment, the device 100 includes a touch screen, a touchpad, a push button for powering the device on/off and locking the device, a volume adjustment rocker button and a slider switch for selecting ringer profiles. The push button may be used to turn the power on/off on the device by depressing the button and holding the button in the depressed state for a predefined time interval, or may be used to lock the device by depressing the button and releasing the button before the predefined time interval has elapsed. In an alternative embodiment, the device 100 also may accept verbal input for activation or deactivation of some functions through the microphone 113.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

In some embodiments, the device 100 is a device where operation of a predefined set of functions on the device is performed exclusively or primarily through the click wheel 114. By using the click wheel 114 as the primary input/control device for operation of the device 100, the number of other input/control devices (such as push buttons, dials, and the like) on the device 100 may be reduced.

Figure 2A:
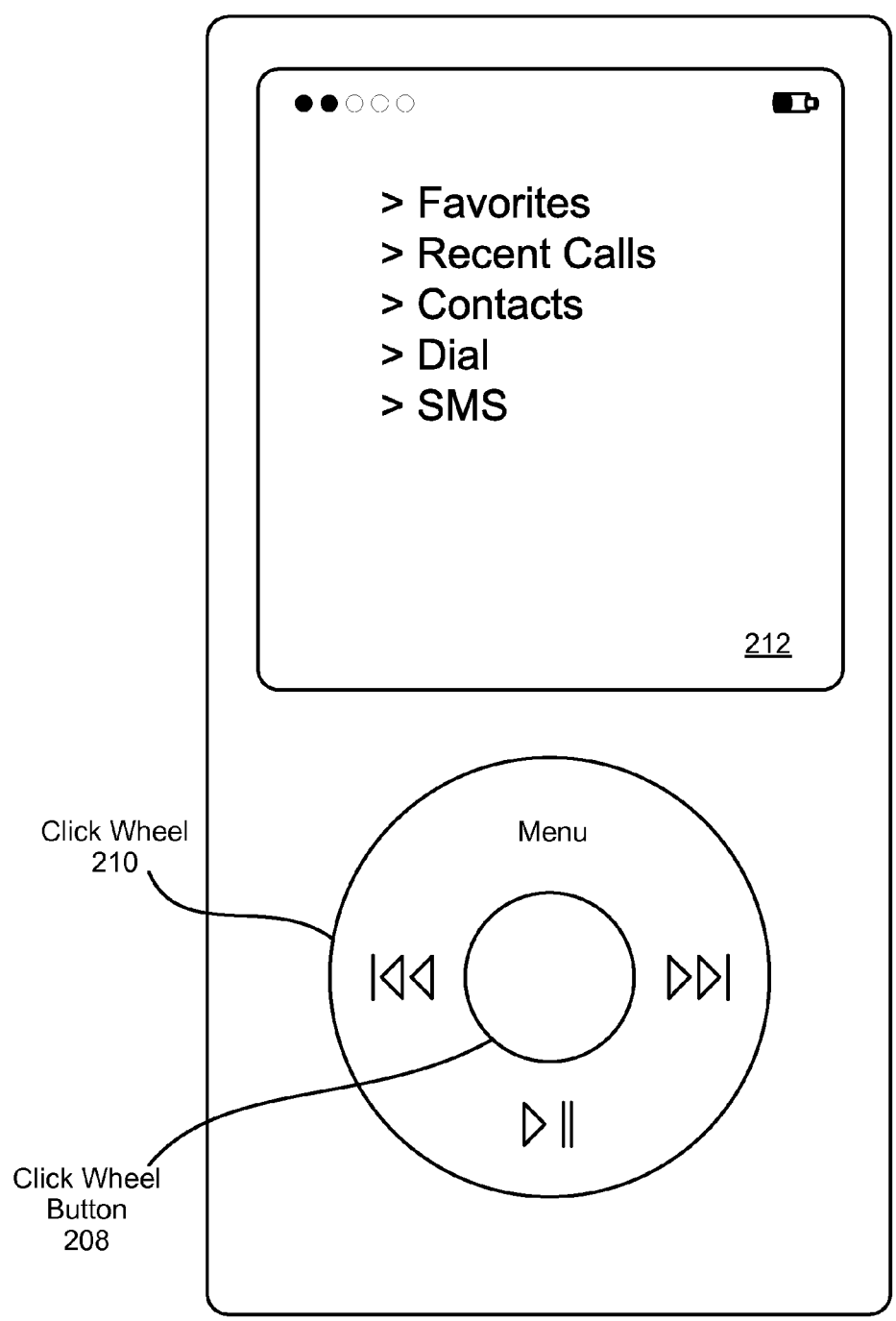
FIG. 2A illustrates a portable communications device having a physical click wheel input device in accordance with some embodiments.
Figure 2B:
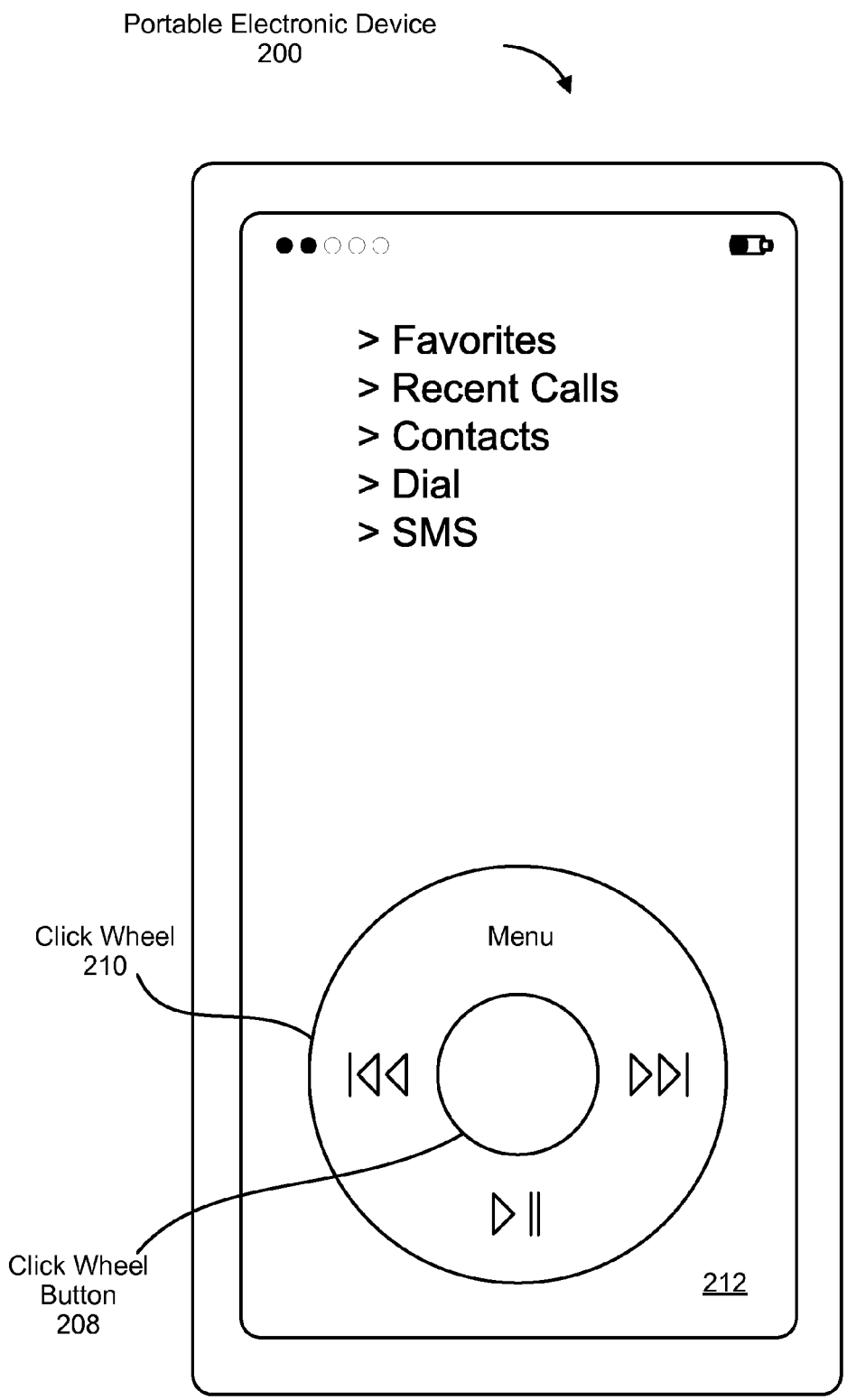
FIG. 2B illustrates a portable communications device having a virtual click wheel input device in accordance with some embodiments.

Attention is now directed towards embodiments of user interfaces and associated processes that may be implemented on a portable electronic device 200. FIG. 2A illustrates a portable communications device having a physical click wheel input device in accordance with some embodiments. In FIG. 2A, device 200 includes a click wheel 210 and a separate display 212. FIG. 2B illustrates a portable communications device having a virtual click wheel input device in accordance with some embodiments. In FIG. 2B, device 200 includes a virtual click wheel 210 displayed on a touch screen display 212. The click wheel constitutes an interface for receiving user commands (such as selection of one of more items and/or icons that are displayed on the display 212) and/or navigation commands (which may, for example, control scrolling through the items and/or icons that are displayed on the display 212). The user may use the click wheel 210 by touching it (making a point of contact) and then moving the point of contact while maintaining contact. Such angular displacement may indicate a navigation command to scroll through the items and/or icons that are displayed on the display 212. By pressing down on the click wheel 210, or on a click wheel button 208 (e.g., at the center of the click wheel), the user may select one or more items and/or icons that are displayed on the display 212. Thus, a pressing down gesture may indicate a user command corresponding to selection. Alternatively, breaking contact with a click wheel image on a touch screen surface may indicate a user command corresponding to selection.

The device 200 may display a menu or hierarchy of the applications that may be executed or run on the device 200. For example, the displayed menu or hierarchy for the applications may include 'Favorites' for popular applications for this user, 'Recent' for calls that have been made, answered, and/or missed within a first pre-determined time period (such as the last day, week or month), or alternately the N most recent calls (regardless of how long ago they occurred, where N is a predefined positive integer, for example an integer between 10 and 100), 'Contacts' (which corresponds to the address book 144 in FIG. 1), 'Dial' (which corresponds to the telephone module 138 in FIG. 1) and 'SMS' (for sending and receiving short text messages). The menu or hierarchy may also include 'Music', 'Extras', 'Settings' and 'Now playing' icons (not shown in the Figures) that correspond to a music player module. The display 212 may also convey other information, such as an icon that indicates a remaining stored power level for the device 200.

Figure 3A:
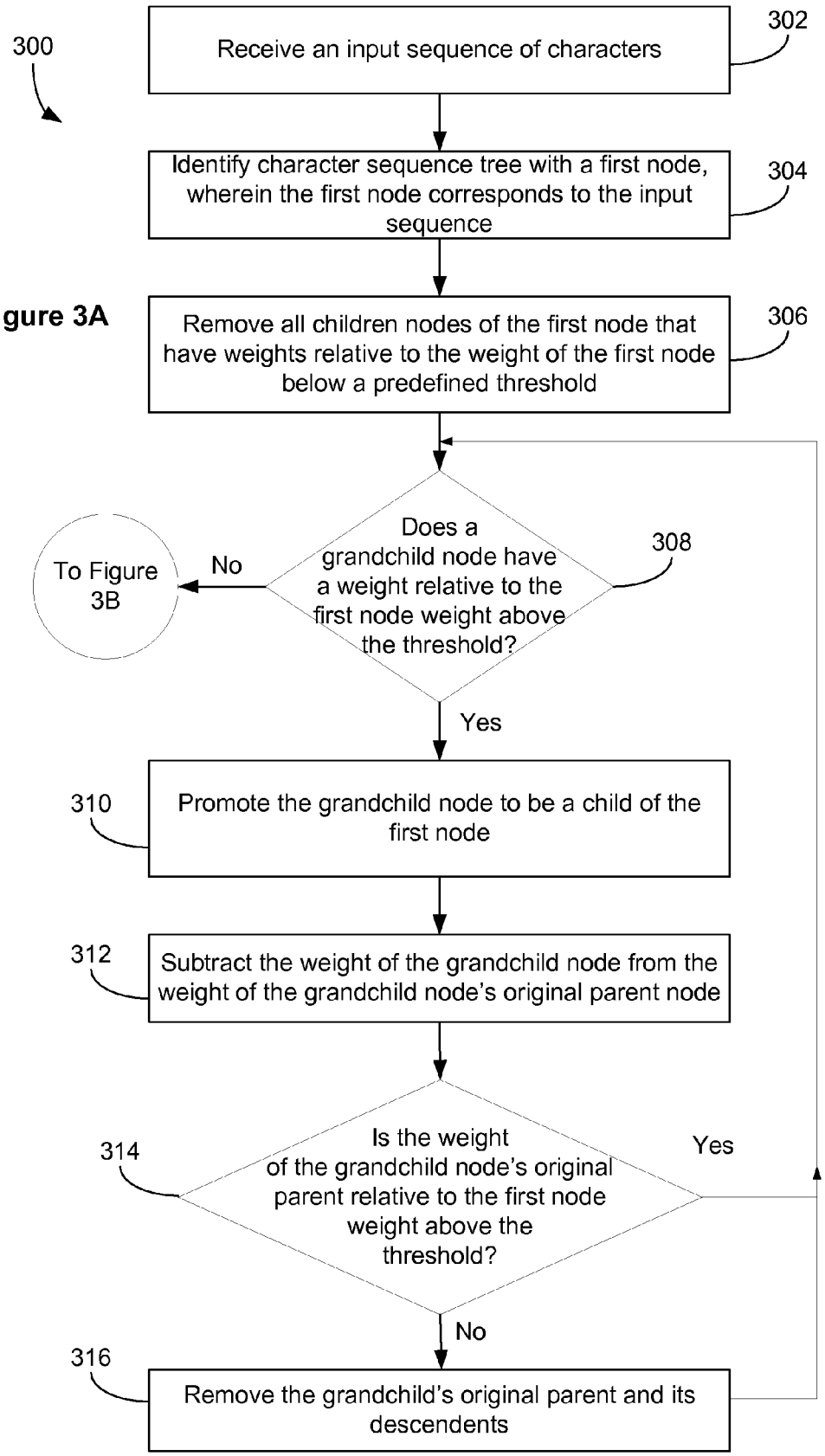
FIGS. 3A-3B are a flow diagram illustrating a process of selecting and providing candidate character sequences in response to text input in accordance with some embodiments.
Figure 3B:
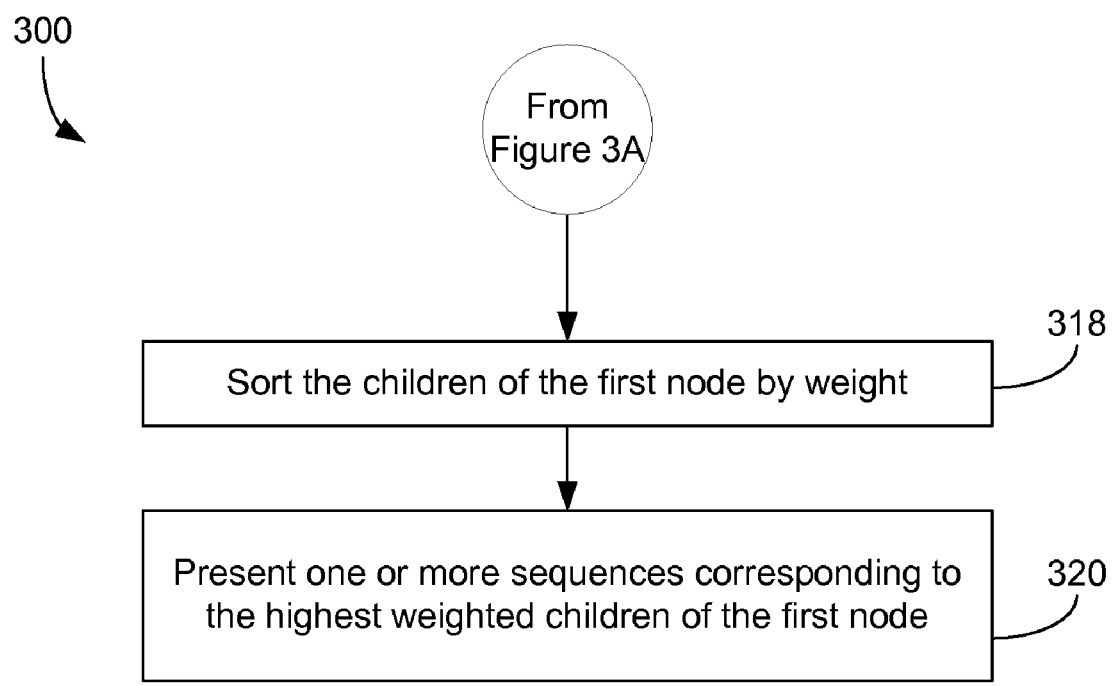

Attention is now directed toward FIG. 3, a flow diagram illustrating a process of selecting and providing candidate character sequences in response to text input in accordance with some embodiments. As text is entered by a user on a device, candidate character sequences corresponding to complete or partial words may be provided in response to the entered text. The user may select a candidate character sequence, some of which are partial words, to extend further or to complete the entered text. As used in the specification and the claims, a "partial word" is a character sequence of two or more characters that is less than a complete word and which may be presented to a user for selection, thereby increasing the speed of the text entry process. Presenting partial words as suggestions for further extending an input sequence helps speed up the text entry process as compared to entering one character at a time or presenting only complete word suggestions. Entering or selecting one letter at a time can be slow, particularly with interfaces, such as the click wheel 210, that are not designed specifically for text entry. On the other hand, presenting only complete words as suggestions to complete an input sequence can be inefficient as well because the complete word suggestions may not include the choice desired by the user, forcing the user back to the other extreme of entering one letter at a time.

An input sequence of one or more characters is received from an input device (302). A user inputs a sequence of characters into the portable device via an input device, such as the click wheel 210 and the click wheel button 208. As used herein, the input character sequence is a sequence of non-whitespace characters, delimited by whitespaces or punctuation, input by the user via the input device. The sequence of characters may constitute a word, number, abbreviation, name, trade name, mnemonic, technical term or other delimited sequence of characters, or at least an attempt to enter a such a sequence.

A character sequence tree is identified (304) with a first node. The first node corresponds to the input sequence. The character sequence tree, which includes portions of the usage frequency tree, is identified from the usage frequency tree 146. The character sequence tree includes the node corresponding to the input sequence (hereinafter the "input sequence node") and its ancestors; in other words, the root node corresponding to the empty string, the input sequence node, and a path from the root node to the input sequence node. The character sequence tree also includes the subtree descending from the input sequence node. The subtree includes nodes corresponding to character sequences that are complete or partial words, for all of which the input sequence is a proper prefix. The children nodes of the input sequence node correspond to character sequences that are concatenations of the input sequence and one additional character. For example, if the input sequence node corresponds to the input sequence "the," then the children nodes of the input sequence node correspond to the character sequences "thea," "theb," "thee," "thec," and so forth, up to and including "they," as well as a child node corresponding to the completed word "the", which may be represented by appending a space character, as the sequence "the " (in this example, there are no entries in the usage frequency tree 146 for words starting with "thez", nor are there entries in the usage frequency tree such as "the-" or "the'" that involve a non-letter character continuation).

All children of the input sequence node whose weights do not satisfy one or more predefined usage frequency criteria are "removed" from further consideration (306). In some embodiments, the children node are removed from consideration by removing them from a copy of the subtree corresponding to the input sequence node. Alternately, the children of the input sequence node whose weights do not satisfy one or more predefined usage frequency criteria are marked as "removed" without actually removing the nodes from the tree or the subtree replica. In yet another embodiment, the identified children are removed from a list of children nodes, without modifying the tree. In some embodiments, the usage frequency criterion is that the weight of the child node w divided by the weight of the input sequence node $w_i$ is greater than a predefined threshold m. In other words, $w/w_i > m$ or $w > mw_i$. In some embodiments, $w/w_i$ is an estimate of the probability that the child node is the desired continuation, and the threshold for this probability is, for example, m=0.05. In some other embodiments, the predefined criterion is that the weight of the child node w is one of the largest N weights of child nodes of the input sequence node, and the value of N is, for example, N=5. Subtrees of children nodes that do not meet this criterion are removed from the character sequence tree as well.

A recursive process is then invoked to identify character sequences that satisfy predefined usage frequency criteria. The recursive process starts with identifying a grandchild node (regardless of whether the grandchild node corresponds to a complete or partial word) of the input sequence node whose weight is sufficient to meet a predefined criterion for promotion to be a child node of the input sequence node. In some embodiments, the recursive process starts with identifying a grandchild node of the input sequence node whose weight is greater than $mw_i$, if any. If there are more than one grandchildren meeting this criterion, then it does not matter which one is chosen. In some other embodiments, the recursive process starts with identifying the highest-weight grandchild node of the input sequence node whose weight is exceeded by fewer than N child node weights, if any. If there is a grandchild node that meets the predefined criterion for promotion (308—yes), that grandchild node is promoted to be a child of the input sequence node (310). The grandchild node and its subtree are moved so that they descend directly from the input sequence node. The weight of the grandchild node is then subtracted from the weight of the node that is the original parent of the grandchild node (312), because the grandchild node and its subtree are no longer descendents of the original parent. If the updated weight of the original parent node is no longer greater than mwi (314—no), then the original parent node and its subtree are removed from further consideration (316). In either case (314—yes or no), the operations starting at 308 are then reapplied to the new character sequence tree with its new weights, and this continues until there is no longer a grandchild that meets the predefined criterion for promotion (308—no). Note that after a grandchild gets promoted, its children are added to the set of grandchildren of the input sequence node, and they too will be tested for promotion the next time around.

When there are no longer any grandchildren nodes of the input sequence node that meet the predefined criterion for promotion (308—no), the children of the input sequence node are sorted by their weights (318). One or more of the character sequences (which may include partial words, complete words, and/or phrases with two or more words) corresponding to the highest weighted children nodes are presented to the user (320). The character sequences are displayed on the display of the device. In some embodiments, up to a predefined number of the characters sequences are displayed, with the highest weighted character sequences in the weight-sorted order having the highest priority for display. The displayed character sequences may include partial words, complete words, and/or phrases with two or more words. When one or more grandchildren nodes have been promoted, and at least one of the promoted nodes is among the highest weighted children, one or more of the displayed partial words are concatenations of the input sequence and two or more characters. In some embodiments, the user selects a partial word to partially complete the input sequence. The device may then identify and present additional character sequences to extend further or complete the input sequence.

In some embodiments, partial words and complete words are provided to the user as separate choices; for example, by presenting complete words with an appended symbol or an appended space character. In some embodiments, options in addition to the highest-weighted character sequences may be provided to the user. The additional options may include a comprehensive plurality of sequences, each of the plurality of sequences being a concatenation of the input sequence and a distinct character from a predetermined set of supported characters. These sequences need not represent words. Their inclusion would make it possible for the user to enter arbitrary sequences of characters. For example, if the language is English and the input sequence is "the," then the plurality of sequences may include "thea," "theb," "thee," and so forth, up to and including "thez"; followed by "the0," "the1," "the2," and so forth, up to and including "the9"; followed by "the-", "the'," "the!," "the %," "the&," "the=," and various other continuations involving punctuation or common symbols. In some embodiments, the highest-weighted character sequences are presented first in a list, to enable rapid access, and the comprehensive plurality of single-character continuations is presented next.

It should be appreciated, however, that there may be no candidate sequence that satisfies the usage frequency criteria. In other words, the input sequence node may have no child node remaining. In this situation, operations 318-320 may be skipped.

In some embodiments, identification of the character tree and the nodes having weights that satisfy the usage frequency criteria do not require copying or modifying of the usage frequency tree 146. Rather, a list of node pointer-weight pairs that represent the current set of children nodes of the input sequence node that satisfy the usage frequency criteria may be stored in the memory 102. Whenever a grandchild node of the input sequence node is promoted, a pointer to the node and the weight of the node is added to the list, and the weight of the parent node of the promoted grandchild node is updated in the list rather than in the usage frequency tree 146. Information from the usage frequency tree 146, such as usage frequency weights, actual character sequences, and descendant nodes, may be accessed via the node pointers. If a child node of the input sequence node no longer satisfies the usage frequency weight criteria, it may be removed from the list. When there are no additional nodes to be added to or removed from the list, the list may be sorted based on the usage frequency weights in accordance with operation 318 described above. Further details are described in relation to FIGS. 7A-7C below.

Figure 5A:
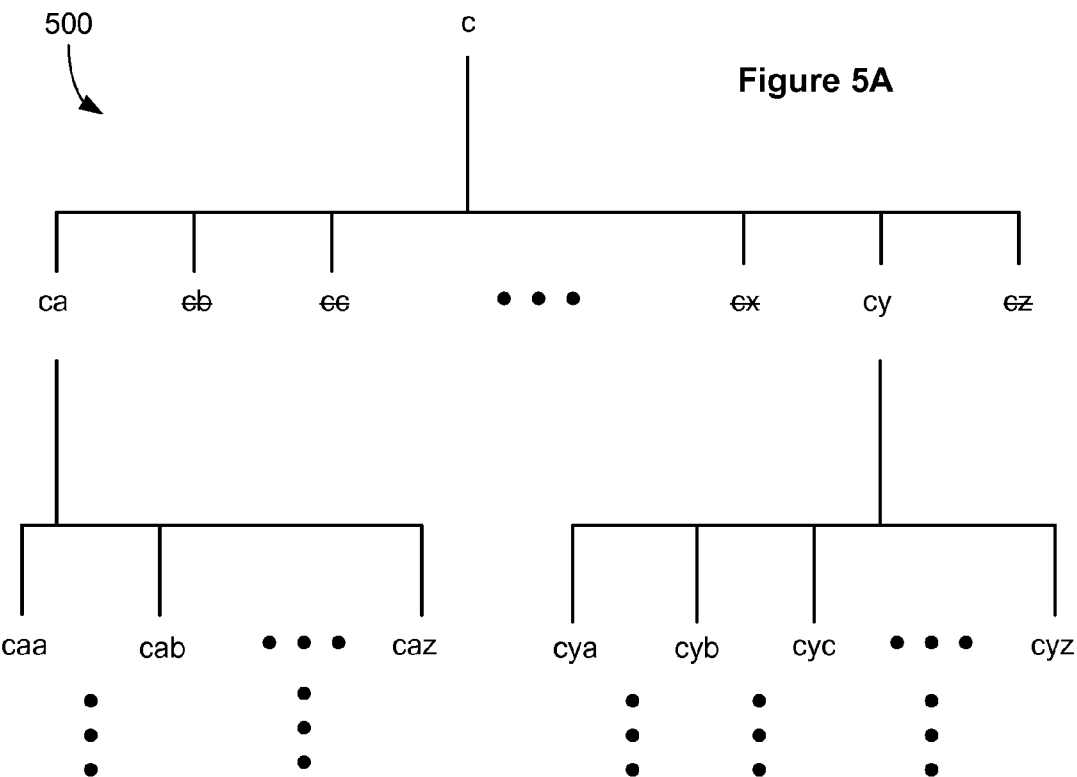
FIGS. 5A-5D illustrate character sequence trees for selecting candidate sequences in accordance with some embodiments.

Attention is now directed toward FIGS. 5A-5D, which illustrate character sequence trees identified during the process for selecting candidate sequences in accordance with some embodiments. FIG. 5A shows a character sequence tree 500 (with the root node, corresponding to the empty string, omitted for convenience) where the input sequence node corresponds to an input sequence "c." All descendents of node "c," which includes any character sequence with "c" as a proper prefix, are potential candidate sequences. Children nodes of "c" include nodes corresponding to sequences "ca," "cb," "cc," and so forth, up to and including "cx," "cy," and "cz." Each of these children nodes has subtrees. As described above, children nodes that do not satisfy predefined usage frequency criteria, and their subtrees, are removed (e.g., marked as "removed" without actually removing the nodes from the tree). For example, if nodes "cb," "cc," . . . , "cx," and "cz" do not satisfy the usage frequency criteria, they are removed from the tree 500 as shown in FIG. 5A, leaving nodes "ca," "cy," and their subtrees.

Figure 5B:
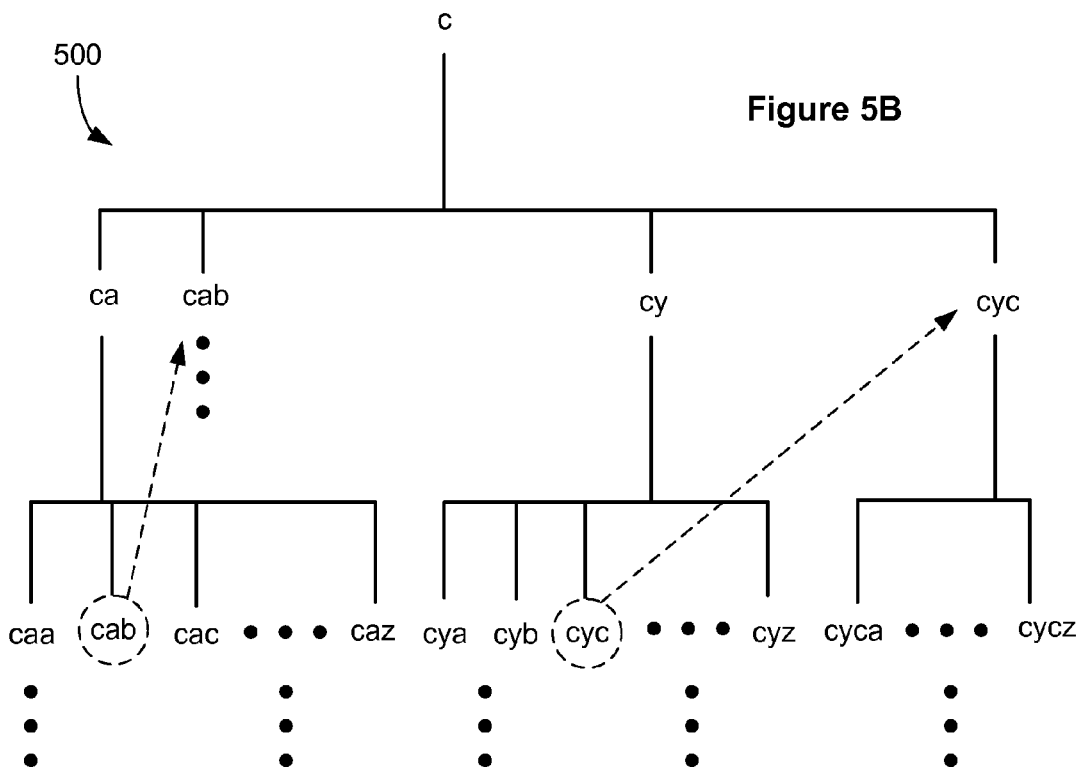
Figure 5C:
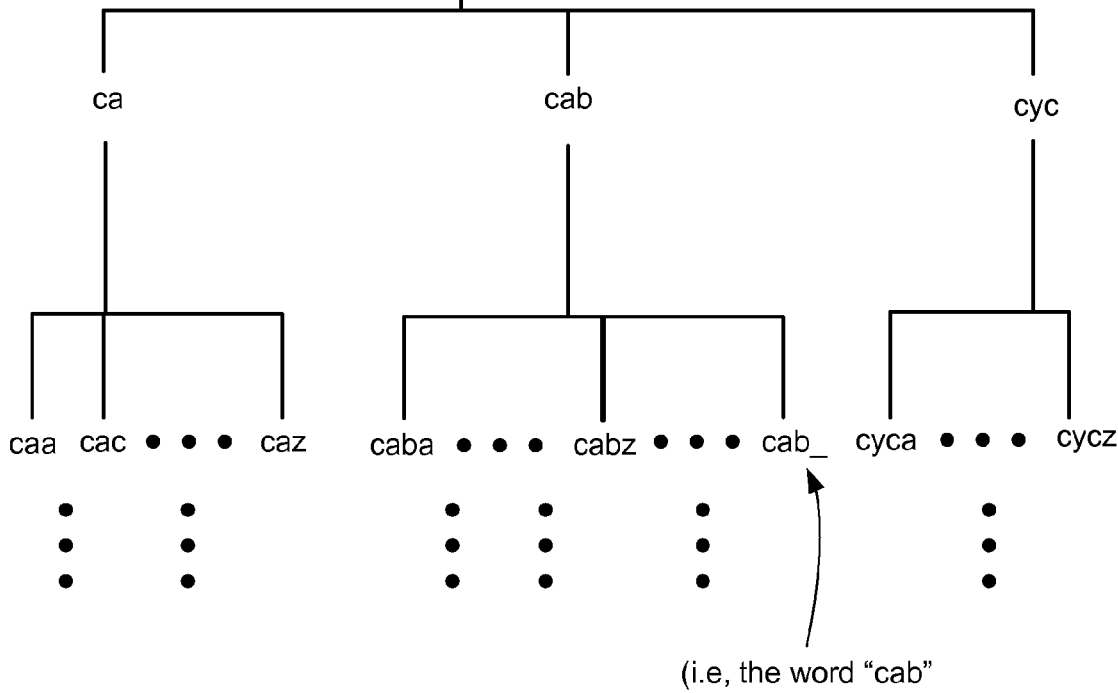
Figure 5D:
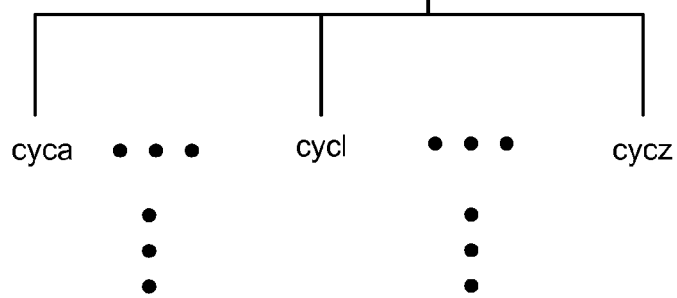

As described above in relation to FIGS. 3A-3B, grandchildren nodes of the input sequence node may be promoted to become children nodes of the input sequence nodes. FIG. 5B illustrates the tree 500 with grandchildren nodes "cab" and "cyc" promoted to become children nodes of input sequence node "c." Their subtrees are moved along with the promoted nodes. After promoting node "cyc," the weight of node "cyc" is subtracted from the weight of node "cy." If the updated weight of node "cy" does not satisfy the usage frequency criteria, then the node "cy" and its subtree are removed, as shown in FIG. 5C, leaving nodes "ca," "cab," and "cyc" as the children nodes of node "c." If no more nodes are promoted or removed, the character sequences "ca," "cab," and "cyc," corresponding to the children nodes of the input sequence node, are sorted by usage frequency weight and at least one of them are presented to the user in the sorted order.

As described above, during process flow 300, a list of children nodes that satisfy the usage frequency criteria may be stored in the memory and manipulated, rather than modifying the usage frequency tree 146. FIGS. 7A-7C illustrate lists of children nodes corresponding to the tree 500 in FIGS. 5A-5C above. In FIG. 7A, the list 700 includes node pointer-weight pairs for nodes "ca" and "cy," which are the children nodes of the tree 500 in FIG. 5A that satisfies the usage frequency criteria. When nodes "cab" and "cyc" are promoted as shown in FIG. 5B, pointers to these nodes and their weights are added to the list 700, as shown in FIG. 7B. Also within the list, the weight of node "cab" is subtracted from the weight of node "ca" and the weight of node "cyc" is subtracted from the weight of node "cy." When node "cy" is removed from the tree 500 based on its updated weight as shown in FIG. 5C, its pointer and weight is removed from the list 700 as well, as shown in FIG. 7C.

If the user is presented with the sequence "cyc" and the user selects it, the input sequence becomes "cyc" and a new character sequence tree 502 (FIG. 5D) is identified. Tree 502 is similar to tree 500 except that the nodes "ca" and "cab" and their subtrees are not in the tree 502 because their corresponding character sequences are no longer possible extensions of the input sequence, given the current input sequence "cyc." Thus, tree 502 only includes the subtree descending from the new input sequence node "cyc." From here, children nodes of "cyc" may be removed and grandchildren nodes may be promoted in accordance with the process described above.

Figure 6A:
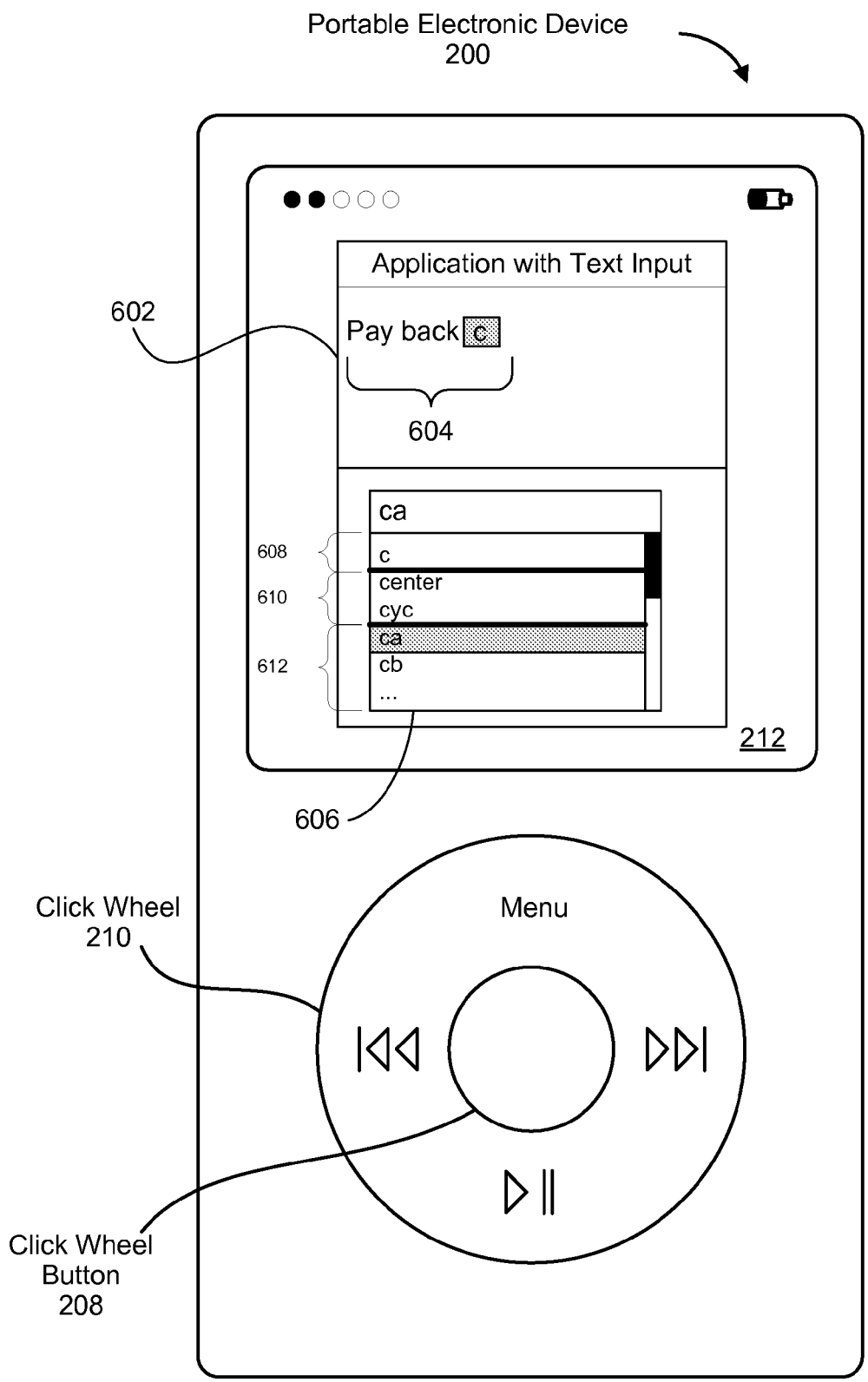
FIGS. 6A-6C illustrate a graphical user interface for entering text on a portable electronic device in accordance with some embodiments.
Figure 6B:
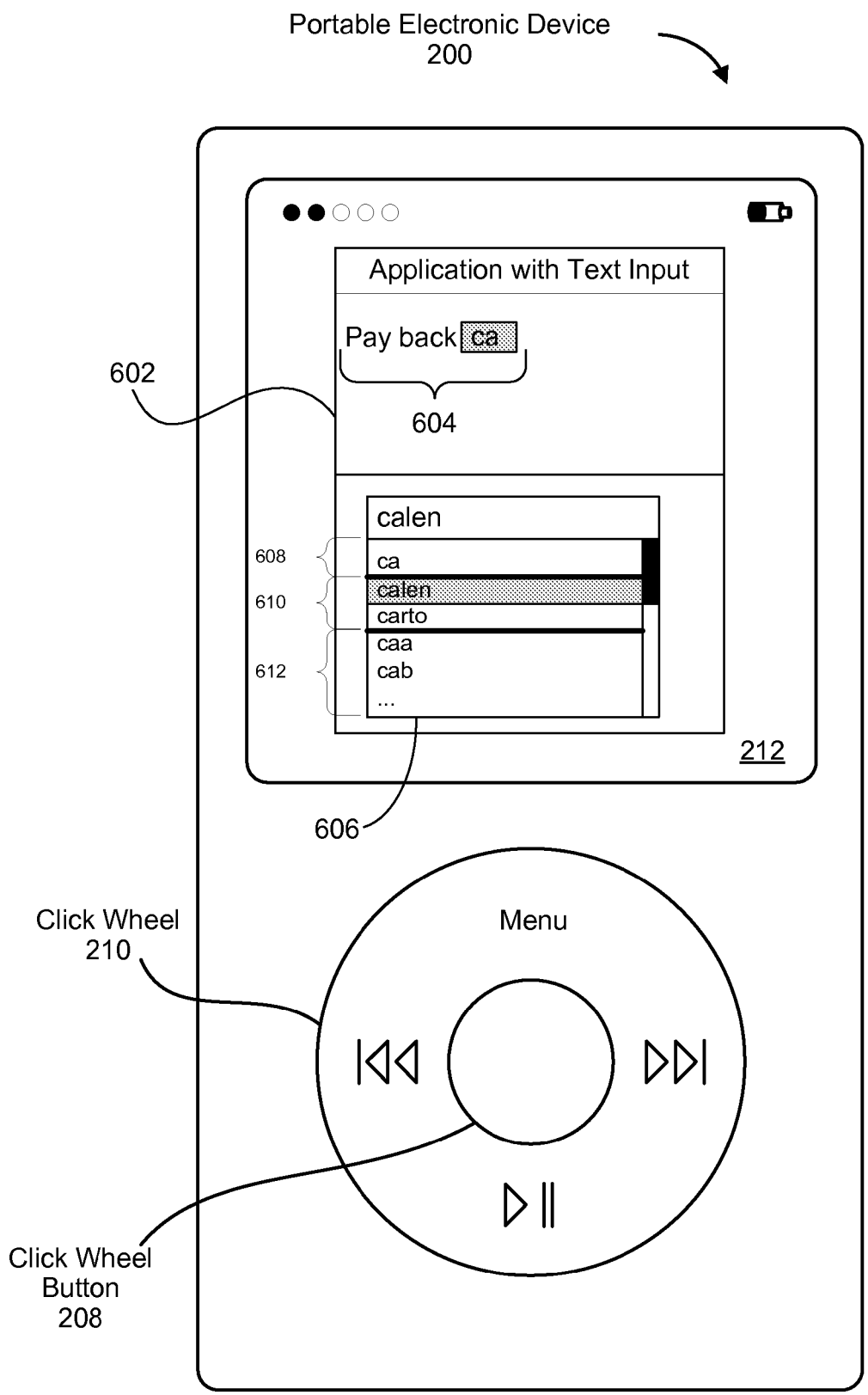

FIGS. 6A-6B illustrate a graphical user interface for entering text on a portable electronic device in accordance with some embodiments. The portable device 200 may include a memo pad application, email client application, Short Message Service (SMS) application, address book application, word processing application, presentation application, or other application with text entry 602, where the user can enter text for storage in the memory of the device. Some or all of these applications may share the same text entry user interface. The user may input text 604 into the application using the click wheel 210 and the click wheel button 208. In the text 604, the input sequence "c" is highlighted, indicating that the sequence "c" is incomplete. The memo pad application may provide suggestions for completing the input sequence in a menu 606, which the user may navigate through using the click wheel 210 and the click wheel button 208. In some embodiments, the menu includes three sets of suggestions. The first set 608 includes the current input sequence followed by a whitespace. Selection of this suggestion completes the current input sequence and starts a new one. The second set 610 includes character sequences selected in accordance with the process described above in relation to FIGS. 3A-3B. The members of the second set are all partial words, since completed words are represented by the trailing white space in this example. The second set may be omitted if no candidate character sequences were selected in accordance with process flow 300 described above. In some other embodiments, the first and/or the third sets may be omitted.

The third set 612 includes a plurality of character sequences. Each of these sequences includes the input sequence followed by a letter of the alphabet. There is one sequence for each letter of the alphabet. Thus, for the English alphabet, there are 26 sequences in the third set, one sequence for each alphabet letter. In some other embodiments, additional sets of suggestions, such as the input sequence followed by numbers and/or common punctuation marks and/or common symbols, may be shown.

When the user selects a suggestion from the menu 606, the input sequence is updated. On the display 212, the original input sequence is replaced with the suggestion selected by the user. Additionally, the menu 606 is updated with new suggestions based on the updated input sequence. As described above, there may be three sets of suggestions. The first set includes the input sequence followed by a whitespace. The second set includes sequences selected based on the updated input sequence and in accordance with process flow 300 described above in relation to FIGS. 3A-3B. Again, the second set may include complete and/or partial words. The third set includes the current input sequence followed by each letter of the alphabet.

Figure 6C:
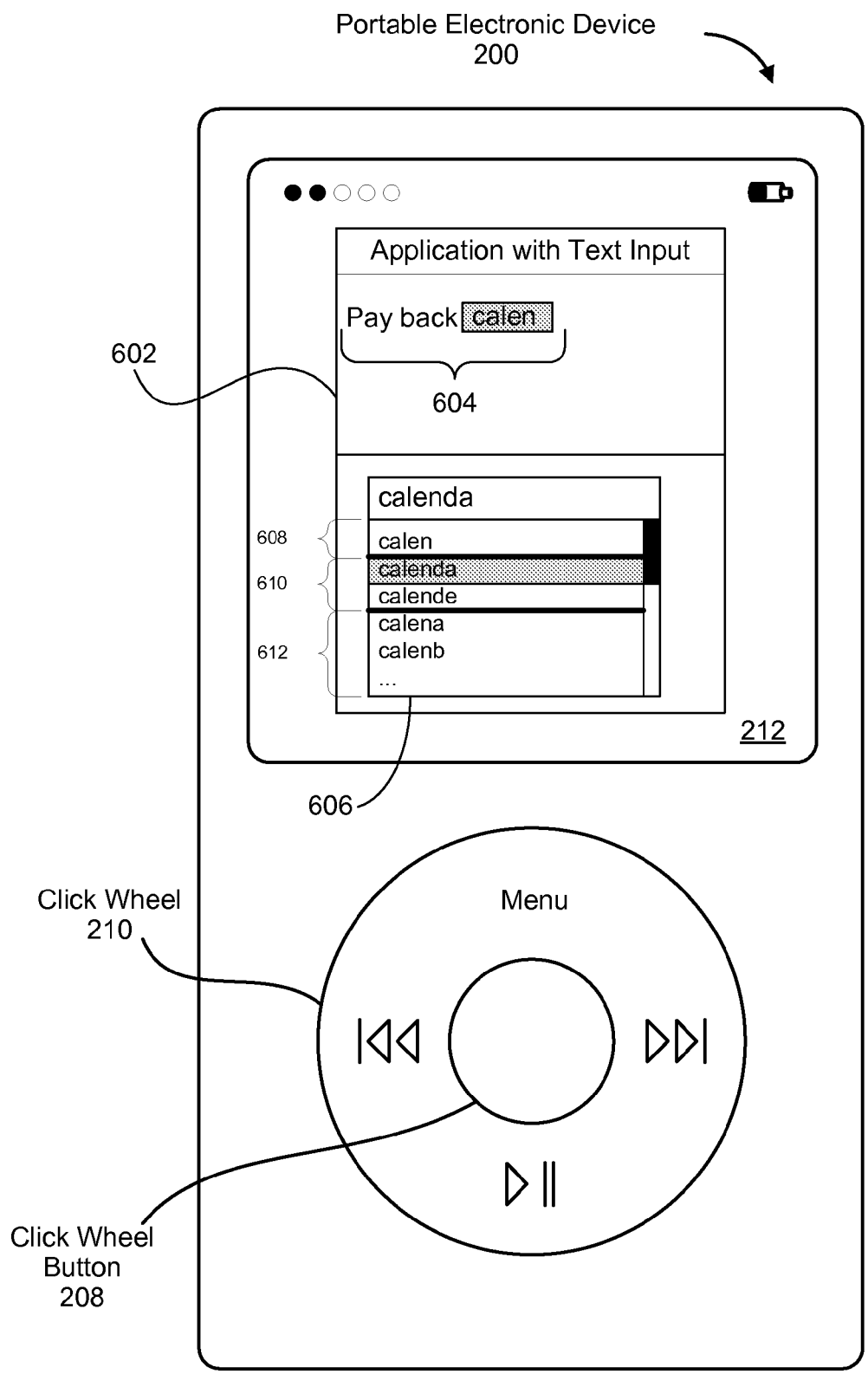

FIGS. 6A-6C illustrate an example of the updating of the menu 606 based on the user's selections. In FIG. 6A, the string "ca" is highlighted as the user selection to further complete the current input sequence "c." In FIG. 6B, "ca" is the (updated) current input sequence. The first set 608 is updated to include the sequence "ca". The second set 610 is updated to include suggestions, such as the partial words "calen" and "carto," that have the current input sequence "ca" as a prefix. The third set 612 is updated to include concatenations of the current input sequence "ca" and letters of the alphabet. If the suggestion "calen" is highlighted and selected by the user, as shown in FIG. 6B, the input sequence is updated to become "calen," as shown in FIG. 6C. The first set 608 is updated to include the sequence "calen". The second set 610 is updated to include suggestions, such as the partial words "calenda" and "calende," that have the current input sequence "calen" as a prefix. The third set 612 is updated to include concatenations of the current input sequence "calen" and letters of the alphabet.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
receiving an input sequence of one or more alphabet characters;
identifying one or more candidate sequences that satisfy predefined usage frequency criteria with respect to the input sequence, each candidate sequence comprising a concatenation of the input sequence and one or more additional alphabet characters, wherein:
the candidate sequences include partial words; and
the identifying one or more candidate sequences that satisfy predefined usage frequency criteria comprises:
identifying a character sequence tree data structure, each node of the character sequence tree corresponding to a distinct character sequence, the input sequence corresponding to a first node in the character sequence tree; and
selecting one or more candidate character sequences corresponding to one or more descendent nodes of the first node that have values above a predefined threshold, wherein a respective value for a respective descendent node of the first node is the usage frequency weight of the respective descendent node divided by the usage frequency weight of the first node; and
presenting a candidate sequence from the one or more identified candidate sequences that is a partial word, wherein the partial word comprises a concatenation of the input sequence and two or more additional alphabet characters and the partial word by itself is not a complete word.

2. The method of claim 1, further comprising presenting a concatenation of the input sequence and a whitespace.

3. The method of claim 1, further comprising presenting a plurality of sequences, each of the plurality of sequences comprising a concatenation of the input sequence and a distinct alphabet character from a predefined set of alphabet characters.

4. The method of claim 1, further comprising, in response to user input, selecting a presented partial word.

5. The method of claim 1, wherein the predefined threshold is 0.05.

6. The method of claim 1, wherein the presenting includes presenting a respective partial word that has at least two alphabet characters concatenated to the input sequence.

7. The method of claim 1, further comprising presenting a candidate sequence that is a phrase with two or more words.

8. The method of claim 1, wherein the usage frequency criteria are automatically updated based on text input by a user.

9. The method of claim 1, wherein the usage frequency criteria take into account grammar rules.

10. A graphical user interface on a portable electronic device with memory and one or more processors to execute one or more programs stored in the memory, the graphical user interface comprising:
an input sequence of one or more alphabet characters;
one or more partial word suggestions that satisfy predefined usage frequency criteria with respect to the input sequence, each partial word suggestion comprising a concatenation of the input sequence and two or more additional alphabet characters and the partial word by itself is not a complete word;
wherein:
the input sequence of one or more alphabet characters are received from a user;
a character sequence data tree structure is identified, each node of the character sequence tree corresponding to a distinct character sequence, the input sequence corresponding to a first node in the character sequence tree; and
one or more partial word suggestions corresponding to one or more descendent nodes of the first node that have values above a predefined threshold are selected, wherein a respective value for a respective descendent node of the first node is the usage frequency weight of the respective descendent node divided by the usage frequency weight of the first node.

11. The graphical user interface of claim 10, further comprising a concatenation of the input sequence and a whitespace.

12. The graphical user interface of claim 10, further comprising a plurality of sequences, each of the plurality of sequences comprising a concatenation of the input sequence and a distinct alphabet character from a predefined set of alphabet characters.

13. A computer readable storage medium storing one or more programs, the one or more programs comprising instructions, which when executed by a portable electronic device, cause the portable electronic device to:
receive an input sequence of one or more alphabet characters;
identify one or more candidate sequences that satisfy predefined usage frequency criteria with respect to the input sequence, each candidate sequence comprising a concatenation of the input sequence and one or more additional alphabet characters, wherein:
the candidate sequences include partial words; and
identifying one or more candidate sequences that satisfy predefined usage frequency criteria comprises:
identifying a character sequence tree data structure, each node of the character sequence tree corresponding to a distinct character sequence, the input sequence corresponding to a first node in the character sequence tree; and
selecting one or more candidate character sequences corresponding to one or more descendent nodes of the first node that have values above a predefined threshold, wherein a respective value for a respective descendent node of the first node is the usage frequency weight of the respective descendent node divided by the usage frequency weight of the first node; and
present a candidate sequence from the one or more identified candidate sequences that is a partial word, wherein the partial word comprises a concatenation of the input sequence and two or more additional alphabet characters and the partial word by itself is not a complete word.

14. A portable electronic device, comprising:
a display;
one or more processors;
memory; and
one or more programs, wherein the is one or more programs are stored in the memory and configured to be executed by the one or more processors, the one or more programs including:
instructions to receive an input sequence of one or more alphabet characters;
instructions to identify one or more candidate sequences that satisfy predefined usage frequency criteria with respect to the input sequence, each candidate sequence comprising a concatenation of the input sequence and one or more additional alphabet characters, wherein:
the candidate sequences include partial words; and
the instructions to identify one or more candidate sequences that satisfy predefined usage frequency criteria comprises:
instructions to identify a character sequence tree data structure, each node of the character sequence tree corresponding to a distinct character sequence, the input sequence corresponding to a first node in the character sequence tree; and
instructions to select one or more candidate character sequences corresponding to one or more descendent nodes of the first node that have values above a predefined threshold, wherein a respective value for a respective descendent node of the first node is the usage frequency weight of the respective descendent node divided by the usage frequency weight of the first node; and
instructions for presenting a candidate sequence from the one or more identified candidate sequences that is a partial word, wherein the partial word comprises a concatenation of the input sequence and two or more additional alphabet characters and the partial word by itself is not a complete word.

15. A portable electronic device, comprising:
means for receiving an input sequence of one or more alphabet characters;
means for identifying one or more candidate sequences that satisfy predefined usage frequency criteria with respect to the input sequence, each candidate sequence comprising a concatenation of the input sequence and one or more additional alphabet characters, wherein:
the candidate sequences include partial words; and
the means for identifying one or more candidate sequences that satisfy predefined usage frequency criteria comprises:
means for identifying a character sequence tree data structure, each node of the character sequence tree corresponding to a distinct character sequence, the input sequence corresponding to a first node in the character sequence tree; and
means for selecting one or more candidate character sequences corresponding to one or more descendent nodes of the first node that have values above a predefined threshold, wherein a respective value for a respective descendent node of the first node is the usage frequency weight of the respective descendent node divided by the usage frequency weight of the first node; and
means for presenting a candidate sequence from the one or more identified candidate sequences that is a partial word, wherein the partial word comprises a concatenation of the input sequence and two or more additional alphabet characters and the partial word by itself is not a complete word.

* * * * *

UNITED STATES PATENT AND TRADEMARK OFFICE
CERTIFICATE OF CORRECTION

PATENT NO. : 7,793,228 B2
APPLICATION NO. : 11/549624
DATED : September 7, 2010
INVENTOR(S) : Philip Andrew Mansfield Page 1 of 1

It is certified that error appears in the above-identified patent and that said Letters Patent is hereby corrected as shown below:

In column 13, line 33, delete ""the %,"" and insert -- "the%," --, therefor.

In column 17, line 62, in claim 14, after "the" delete "is".

Signed and Sealed this
Twenty-second Day of November, 2011

David J. Kappos
*Director of the United States Patent and Trademark Office*